US009108181B2

(12) United States Patent
Stockwell et al.

(10) Patent No.: US 9,108,181 B2
(45) Date of Patent: Aug. 18, 2015

(54) STRUCTURALLY ENHANCED CRACKING CATALYSTS

(75) Inventors: David Matheson Stockwell, Westfield, NJ (US); John M. Macaoay, Linden, NJ (US)

(73) Assignee: BASF Corporation, Florham Park, NJ (US)

( * ) Notice: Subject to any disclaimer, the term of this patent is extended or adjusted under 35 U.S.C. 154(b) by 1357 days.

(21) Appl. No.: 12/674,028

(22) PCT Filed: Jun. 12, 2008

(86) PCT No.: PCT/US2008/066637
§ 371 (c)(1),
(2), (4) Date: Sep. 10, 2010

(87) PCT Pub. No.: WO2008/157199
PCT Pub. Date: Dec. 24, 2008

(65) Prior Publication Data
US 2011/0000821 A1    Jan. 6, 2011

Related U.S. Application Data

(63) Continuation-in-part of application No. 11/765,784, filed on Jun. 20, 2007, now Pat. No. 8,278,235.

(51) Int. Cl.
| | | |
|---|---|---|
| B01J 29/06 | (2006.01) | |
| B01J 21/16 | (2006.01) | |
| B01J 29/08 | (2006.01) | |
| B01J 35/00 | (2006.01) | |
| B01J 37/00 | (2006.01) | |
| B01J 37/02 | (2006.01) | |
| C10G 11/05 | (2006.01) | |
| C10G 11/18 | (2006.01) | |
| B01J 21/04 | (2006.01) | |
| B01J 35/02 | (2006.01) | |

(52) U.S. Cl.
CPC .............. *B01J 21/16* (2013.01); *B01J 29/084* (2013.01); *B01J 35/008* (2013.01); *B01J 37/0045* (2013.01); *B01J 37/0221* (2013.01); *B01J 37/0246* (2013.01); *C10G 11/05* (2013.01); *C10G 11/18* (2013.01); *B01J 21/04* (2013.01); *B01J 35/023* (2013.01); *B01J 2229/36* (2013.01); *B01J 2229/38* (2013.01); *B01J 2229/64* (2013.01); *C10G 2400/02* (2013.01); *C10G 2400/20* (2013.01)

(58) Field of Classification Search
CPC ....................................................... B01J 29/06
See application file for complete search history.

(56) References Cited

U.S. PATENT DOCUMENTS

| | | | |
|---|---|---|---|
| 3,939,058 A * | 2/1976 | Plank et al. ...................... 502/65 |
| 4,394,251 A | 7/1983 | Miller | |
| 4,420,419 A | 12/1983 | Ogawa et al. | |
| 4,427,577 A * | 1/1984 | Koetsier ........................... 502/66 |
| 4,919,787 A | 4/1990 | Chester et al. | |
| 4,938,863 A | 7/1990 | Degnan et al. | |
| 5,077,253 A | 12/1991 | Chu et al. | |
| 5,082,814 A | 1/1992 | Stockwell et al. | |
| 5,179,054 A | 1/1993 | Schipper et al. | |
| 5,200,382 A | 4/1993 | Cody et al. | |
| 5,228,980 A | 7/1993 | Stockwell et al. | |
| 5,286,370 A | 2/1994 | Chu et al. | |
| 5,935,889 A | 8/1999 | Murrell et al. | |
| 5,972,205 A | 10/1999 | Tsang et al. | |
| 6,013,851 A | 1/2000 | Verrelst et al. | |
| 6,225,255 B1 | 5/2001 | Shibasaki | |
| 6,649,802 B1 * | 11/2003 | Frame et al. .................. 585/533 |
| 6,656,347 B2 | 12/2003 | Stockwell et al. | |
| 6,673,235 B2 | 1/2004 | Harris et al. | |
| 6,696,378 B2 | 2/2004 | Gibson et al. | |
| 6,699,811 B1 | 3/2004 | Mohr et al. | |
| 6,710,003 B2 | 3/2004 | Jan et al. | |
| 6,716,338 B2 | 4/2004 | Madon et al. | |
| 6,812,181 B2 | 11/2004 | van der Berge et al. | |
| 6,867,341 B1 | 3/2005 | Abrevaya et al. | |
| 6,958,305 B2 | 10/2005 | Mohr et al. | |
| 7,101,473 B2 | 9/2006 | Hurley | |
| 7,320,782 B1 | 1/2008 | Jacobsen et al. | |
| 2004/0235642 A1 | 11/2004 | Xu et al. | |
| 2005/0284799 A1 | 12/2005 | Bauer et al. | |
| 2008/0064912 A1 | 3/2008 | Jacobsen et al. | |

FOREIGN PATENT DOCUMENTS

| | | |
|---|---|---|
| EP | 0118632 | 9/1984 |
| EP | 0118632 A | 9/1984 |
| EP | 0697247 | 9/1999 |
| WO | 95/33561 A | 12/1995 |
| WO | 99/28031 A | 6/1999 |
| WO | 2005/082530 A | 9/2005 |

OTHER PUBLICATIONS

International Search Report for PCT/US2008/066637 Mailed Aug. 28, 2009.
MacZura, "Aluminum Oxide (Alumina), Calcined Tabular, and Aluminate Cements" in the Kirk-Othmer Encyclopedia of Chemical Technology, Wiley, 2003, posted on-line Jan. 17, 2003.
OA dated Dec. 11, 2009 for PCT Application Serial No. 11765784, 14 pages.
OA dated May 26, 2010 for PCT Application Serial No. 11765784, 13 pages.
OA dated Dec. 9, 2011 for PCT U.S. Appl. No. 11/765,784, 30 pages.
Van Der Pulin N et al: "Preparation and catalytic testing of zeolite coatings on preshaped alumina supports" Microporous and Mesoporous Materials, Elsevier Science Publishing, New York, US, vol. 27, No. 1, Jan. 1, 1999, pp. 95-106, XP004154509 ISSN: 1387-1811 abstract p. 96, paragraph 2.1-p. 97, paragraph 2.2 p. 105, paragraph5.-p. 106.
International Search Report for PCT Patent Application No. US2008/066637 dated Aug. 28, 2009, 23 pages.
FCC Catalysts: Glossary of Terms (1991) pp. 18-19.

\* cited by examiner

*Primary Examiner* — Randy Boyer
(74) *Attorney, Agent, or Firm* — Foley & Lardner LLP

(57) ABSTRACT

A cracking catalyst contains a substantially inert core and an active shell, the active shell containing a zeolite catalyst and a matrix. Methods of making and using the cracking catalyst are also described.

2 Claims, 2 Drawing Sheets

STRUCTURALLY ENHANCED CRACKING CATALYSTS

CROSS-REFERENCE TO RELATED APPLICATIONS

This is a U.S. National Stage application based on PCT Application No. PCT/US2008/066637, filed Jun. 12, 2008, which is a continuation-in-part of U.S. Ser. No. 11/765,784, filed Jun. 20, 2007.

BACKGROUND OF THE INVENTION

The present invention relates to novel fluid catalytic cracking catalysts comprising microspheres containing zeolite and having exceptionally high activity and other desirable characteristics, methods for making such catalysts and the use of such catalysts for cracking petroleum feedstocks, particularly under short residence time processes.

Oil refinery cracking processes allow the production of light products such as liquefied petroleum gas (LPG) and gasoline from heavier crude oil distillation fractions such as gas oils and residues. Current cracking technologies can be classified into the two general categories: thermal cracking (also known as steam cracking) and catalytic cracking. Specifically, Fluid Catalytic Cracking (FCC) is a conversion process in a refinery for upgrading low value heavy hydrocarbons into high value light distillates and LPG. The process employs solid acid catalysts such as zeolites to promote cracking reactions in a riser reactor/fluid bed regenerator system.

Since the 1960's, most commercial fluid catalytic cracking catalysts have contained zeolites as an active component. Such catalysts have taken the form of small particles, called microspheres, containing both an active zeolite component and a non-zeolite component. Frequently, the non-zeolitic component is referred to as the matrix for the zeolitic component of the catalyst.

In prior art fluid catalytic cracking catalysts, the active zeolitic component is incorporated into the microspheres of the catalyst by one of two general techniques. In one technique, the zeolitic component is crystallized and then incorporated into microspheres in a separate step. In the second technique, the in-situ technique, microspheres are first formed and the zeolitic component is then crystallized in the microspheres themselves to provide microspheres containing both zeolitic and non-zeolitic components.

It has long been recognized that for a fluid catalytic cracking catalyst to be commercially successful, it must have commercially acceptable activity, selectivity, and stability characteristics. It must be sufficiently active to give economically attractive yields, it must have good selectivity towards producing products that are desired and not producing products that are not desired, and it must be sufficiently hydrothermally stable and attrition resistant to have a commercially useful life.

Two products that are particularly undesirable in commercial catalytic cracking processes are coke and hydrogen. Even small increases in the yields of these products relative to the yield of gasoline can cause significant practical problems. For example, increases in the amount of coke produced can cause undesirable increases in the heat that is generated by burning off the coke during the highly exothermic regeneration of the catalyst. Conversely, insufficient coke production can also distort the heat balance of the cracking process. In addition, in commercial refineries, expensive compressors are used to handle high volume gases, such as hydrogen. Increases in the volume of hydrogen produced, therefore, can add substantially to the capital expense of the refinery.

U.S. Pat. No. 4,493,902, the teachings of which are incorporated herein by cross-reference, discloses novel fluid cracking catalysts comprising attrition-resistant, high zeolitic content, catalytically active microspheres containing more than about 40%, preferably 50-70% by weight Y faujasite and methods for making such catalysts by crystallizing more than about 40% sodium Y zeolite in porous microspheres composed of a mixture of two different forms of chemically reactive calcined clay, namely, metakaolin (kaolin calcined to undergo a strong endothermic reaction associated with dehydroxylation) and kaolin clay calcined under conditions more severe than those used to convert kaolin to metakaolin, i.e., kaolin clay calcined to undergo the characteristic kaolin exothermic reaction, sometimes referred to as the spinel form of calcined kaolin. In a preferred embodiment, the microspheres containing the two forms of calcined kaolin clay are immersed in an alkaline sodium silicate solution, which is heated, preferably until the maximum obtainable amount of Y faujasite is crystallized in the microspheres.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as attrition-resistance.

The aforementioned technology has met widespread commercial success. Because of the availability of high zeolite content microspheres which are also attrition-resistant, custom designed catalysts are now available to oil refineries with specific performance goals, such as improved activity and/or selectivity without incurring costly mechanical redesigns. A significant portion of the FCC catalysts presently supplied to domestic and foreign oil refiners is based on this technology. Refineries whose FCC units are limited by the maximum tolerable regenerator temperature or by air blower capacity seek selectivity improvements resulting in reductions in coke make while the gas compressor limitations make catalysts that reduce gas make highly desirable. Seemingly a small reduction in coke can represent a significant economic benefit to the operation of an FCC unit with air blower or regenerator temperature limitations.

Improvements in cracking activity and gasoline selectivity of cracking catalysts do not necessarily go hand in hand. Thus, a cracking catalyst can have outstandingly high cracking activity, but if the activity results in a high level of conversion to coke and/or gas at the expense of gasoline the catalyst will have limited utility. Catalytic cracking activity in present day FCC catalysts is attributable to both the zeolite and non-zeolite (e.g., matrix) components. Zeolite cracking tends to be gasoline selective. Matrix cracking tends to be less gasoline selective. After appropriate ion-exchange treatments with rare earth cations, high zeolite content microspheres produced by the in situ procedure described in the '902 patent are both highly active and highly gasoline selective. As zeolite content of these unblended microspheres is increased, both activity and selectivity tend to increase. This may be explained by the decrease in matrix content with increase in zeolite content and the decreasingly prominent role of nonselective matrix cracking. Thus, increases in the zeolite content of the high zeolite content microspheres have been reported to be highly desirable.

The activity and selectivity characteristics of the catalysts formed by the process of the '902 patent are achieved even though, in general, the catalysts have relatively low total porosity as compared to fluid catalytic cracking catalysts prepared by incorporating the zeolite content into a matrix. In particular, the microspheres of such catalysts, in some cases, have a total porosity of less than about 0.15 cc/g. or even less than about 0.10 cc/g. In general, the microspheres of the '902 patent have a total porosity of less than 0.30 cc/g. As used herein, "total porosity" means the volume of pores having diameters in the range of 35-20,000 Å, as determined by the mercury porosimetry technique. The '902 patent noted that it was surprising that microspheres having a total porosity of less than about 0.15 cc/g. exhibit the activity and selectivity characteristics found. For example, such a result is contrary to the prior art disclosures that low pore volumes "can lead to selectivity losses due to diffusional restrictions."

It is believed that the relatively low porosity of the catalyst microspheres formed as in the '902 patent does not adversely effect activity and selectivity characteristics, since the microspheres of the '902 patent are not diffusion limited relative to the typical FCC processing conditions which were used at the time of the patent. In particular, catalyst contact time with the feed to be cracked was typically 5 seconds or more. Thus, while typical FCC catalysts formed by mechanically incorporating the zeolite within a matrix may have been more porous, the reaction time in prior art FCC risers did not yield any advantage in activity or selectivity. This result inspired the conclusion that transport processes were not at all limiting in FCC catalysts, at least outside the zeolite structure. Assertions made to the contrary were inconsistent with the facts and easily dismissed as self-serving. Importantly, the attrition resistance of the microspheres prepared in accordance with the '902 patent was superior to the conventional FCC catalysts in which the crystallized zeolite catalytic component was physically incorporated into the non-zeolitic matrix.

Recently, however, FCC apparatus have been developed which drastically reduce the contact time between the catalyst and the feed which is to be cracked. Conventionally, the reactor is a riser in which the catalyst and hydrocarbon feed enter at the bottom of the riser and are transported through the riser. The hot catalyst effects cracking of the hydrocarbon during the passage through the riser and upon discharge from the riser, the cracked products are separated from the catalyst. The catalyst is then delivered to a regenerator where the coke is removed, thereby cleaning the catalyst and at the same time providing the necessary heat for the catalyst in the riser reactor. The newer riser reactors operate at lower residence time and higher operating temperatures to minimize coke selectivity and delta coke. Several of the designs do not even employ a riser, further reducing contact time to below one second. Gasoline and dry gas selectivity can improve as a result of the hardware changes. These FCC unit modifications are marketed as valuable independent of the type of catalyst purchased, implying an absence of systematic problems in state of the art catalyst technology.

The processing of increasingly heavier feeds in FCC type processes and the tendency of such feeds to elevate coke production and yield undesirable products have also led to new methods of contacting the feeds with catalyst. The methods of contacting FCC catalyst for very short contact periods have been of particular interest. Thus, short contact times of less than 3 seconds in the riser, and ultra short contact times of 1 second or less have shown improvements in selectivity to gasoline while decreasing coke and dry gas production.

To compensate for the continuing decline in catalyst-oil contact time in FCC processing, the "equilibrium" catalysts in use have tended to become more active. Thus, increases in the total surface area of the catalyst need to be achieved and as well, the level of rare earth oxide promoters added to the catalysts are increasing. Moreover, cracking temperatures are rising to compensate for the reduction in conversion. Unfortunately, it has been found that the API gravity of the bottoms formed during short contact time (SCT) FCC often increases after a unit revamp, leading some to suggest that the heaviest portion of the hydrocarbon feed takes longer to crack. Further, while a high total surface area of the catalyst is valued, the FCC process still values attrition resistance. Accordingly, while not obvious to those participating in the art, it has become increasingly likely that an optimization of FCC catalysts for the new short contact time and ultra short contact time processing which is presently being used is needed.

It is now theorized that, under the short contact time processing of hydrocarbons, that further improvements can be gained by eliminating diffusion limitations that may still exist in current catalysts. This is being concluded even as these materials excel at the application. It is theorized that improvements in these catalysts may be produced by optimization of catalyst porosity and the elimination of active site occlusion and diffusional restrictions of the binder phases present in catalysts prepared by the so-called incorporation method.

In commonly assigned U.S. Pat. No. 6,656,347, issued Dec. 2, 2003, and incorporated herein by reference, zeolite microspheres are formed which are macroporous, have sufficient levels of zeolite to be very active and are of a unique morphology to achieve effective conversion of hydrocarbons to cracked gasoline products with improved bottoms cracking under SCT FCC processing. The novel zeolitic microspheres of the invention are produced by novel processing, which is a modification of technology described in U.S. Pat. No. 4,493, 902. It has been found that if the non-zeolitic, alumina-rich matrix of the catalyst is derived from an ultrafine hydrous kaolin source having a particulate size such that 90 wt. % of the hydrous kaolin particles are less than 2 microns, and which is pulverized and calcined through the exotherm, a macroporous zeolite microsphere can be produced. More generally, the FCC catalyst matrix useful in this invention to achieve FCC catalyst macroporosity is derived from alumina sources, such as kaolin calcined through the exotherm, that have a specified water pore volume, which distinguishes over prior art calcined kaolin used to form the catalyst matrix. The water pore volume is derived from an Incipient Slurry Point (ISP) test, which is described in the patent.

The morphology of the microsphere catalysts which are formed is unique relative to the in-situ microsphere catalysts formed previously. Use of a pulverized, ultrafine hydrous kaolin calcined through the exotherm yields in-situ zeolite microspheres having a macroporous structure in which the macropores of the structure are essentially coated or lined with zeolite subsequent to crystallization. Macroporosity as defined herein means the catalyst has a macropore volume in the pore diameter range of 600-20,000 Å of at least 0.07 cc/gm, preferably at least 0.10 cc/gm mercury intrusion and a total porosity of greater than 0.30 cc/g. The macroporous catalysts also have a BET surface area less than 500 m$^2$/g. The catalysts have been found optimal for FCC processing, including the short contact time processing in which the hydrocarbon feed is contacted with a catalyst for times of about 3 seconds or less.

The microsphere catalysts described in U.S. Pat. No. 6,656,347 have a morphology which allows fast diffusion into the catalyst due to the macroporosity and enhanced dispersion of the matrix, and further provides the highest accessibility to the zeolite inasmuch as the zeolite is freely coated onto the walls of the pores. The term "freely" means that the zeolite phase is present on the surface of the matrix and is unobstructed by any binder phases. Merely having macroporosity does not provide the results that have been obtained since conventional incorporated catalysts have similar macroporosity. It is therefore the combination of porosity and zeolite-coated macropore walls that give the surprising selectivity results.

The macroporous zeolite microspheres which are formed in accordance with U.S. Pat. No. 6,656,347, have found wide commercial success in view of the improvement in gasoline and propylene yields. However, it is theorized that these high pore volume catalysts are still marginally mass transfer limited under short contact time FCC processing. Unfortunately, because of the higher porosity of these catalysts, the catalysts are also less attrition resistant than traditional in-situ FCC catalysts, such as formed by the technology disclosed in U.S. Pat. Nos. 4,493,902 or 6,696,378. The reduced attrition resistance of the high pore volume catalysts has disadvantageously limited their utility in certain FCC units sensitive to regenerator stack opacity, i.e. increased dust emissions, which can be regulated by governmental agencies. Refiners limited in this way are unable to reap the benefits of the high value gasoline and propylene that are formed at higher yields by the high pore volume catalysts. Instead, the regulations indirectly force the refiners to employ low opacity, low abrasion loss index catalysts that produce systematically lower gasoline yields.

The formation of low pore volume in-situ zeolite microspheres such as produced by the aforementioned technology as disclosed in U.S. Pat. Nos. 4,493,902 or 6,696,378, has also met commercial success due to the activity of the high zeolite content of the microspheres and further due to the good attrition resistance of such catalysts. It would be useful however, to provide an FCC zeolite catalyst microsphere which has the good attrition resistance of the low pore volume catalyst and yet provide improved gasoline and propylene yields similar to the catalyst disclosed in U.S. Pat. No. 6,656,347.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

A core/shell FCC catalyst is described wherein a majority of the catalyst volume is in an active shell containing matrix and zeolite and a minority of the catalyst volume is in a core having substantially less cracking activity per unit volume, preferably negligible cracking activity per unit volume. The diffusion path length from the exterior of the catalyst through the available active catalyst is therefore shorter than the conventional catalyst without the core but having the same overall microsphere diameter.

In one embodiment, the shell has low pore volume, comparable to traditional in-situ catalysts, and therefore the shell is quite attrition resistant and the catalyst yields low fines and stack opacity. Cracking yields are improved over conventional in-situ catalysts of comparable pore volume and attrition resistance however, due to the reduced diffusion path length.

In another embodiment, the shell has high pore volume and a macroporous zeolite-on-matrix morphology characteristic of the patented Structurally Enhanced Cracking Catalysts of aforementioned U.S. Pat. No. 6,656,347. The improvement is the presence of the largely inert core that reduces diffusion path length and is believed to further improve the yields under short contact time conditions of the novel core/shell catalyst over the patented macroporous catalyst in primary cracking products such as gasoline.

In other embodiments the shell may contain any type of active catalytic cracking function and additional features to improve FCC performance such as metals passivation, attrition resistance, etc.

In still another embodiment, the inert core/active shell can be prepared using the ingredients and processes previously known and already used to manufacture incorporated FCC catalysts. For example, known incorporated FCC catalyst production methods may be used. The novelty is in the active core/inert shell configuration of the invention.

Yet another aspect of the invention relates to a cracking process involving contacting a hydrocarbon feedstream and a cracking catalyst containing a substantially inert core and an active shell, the active shell containing a zeolite catalyst and a matrix in an FCC reactor at a suitable temperature to provide a cracked product.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
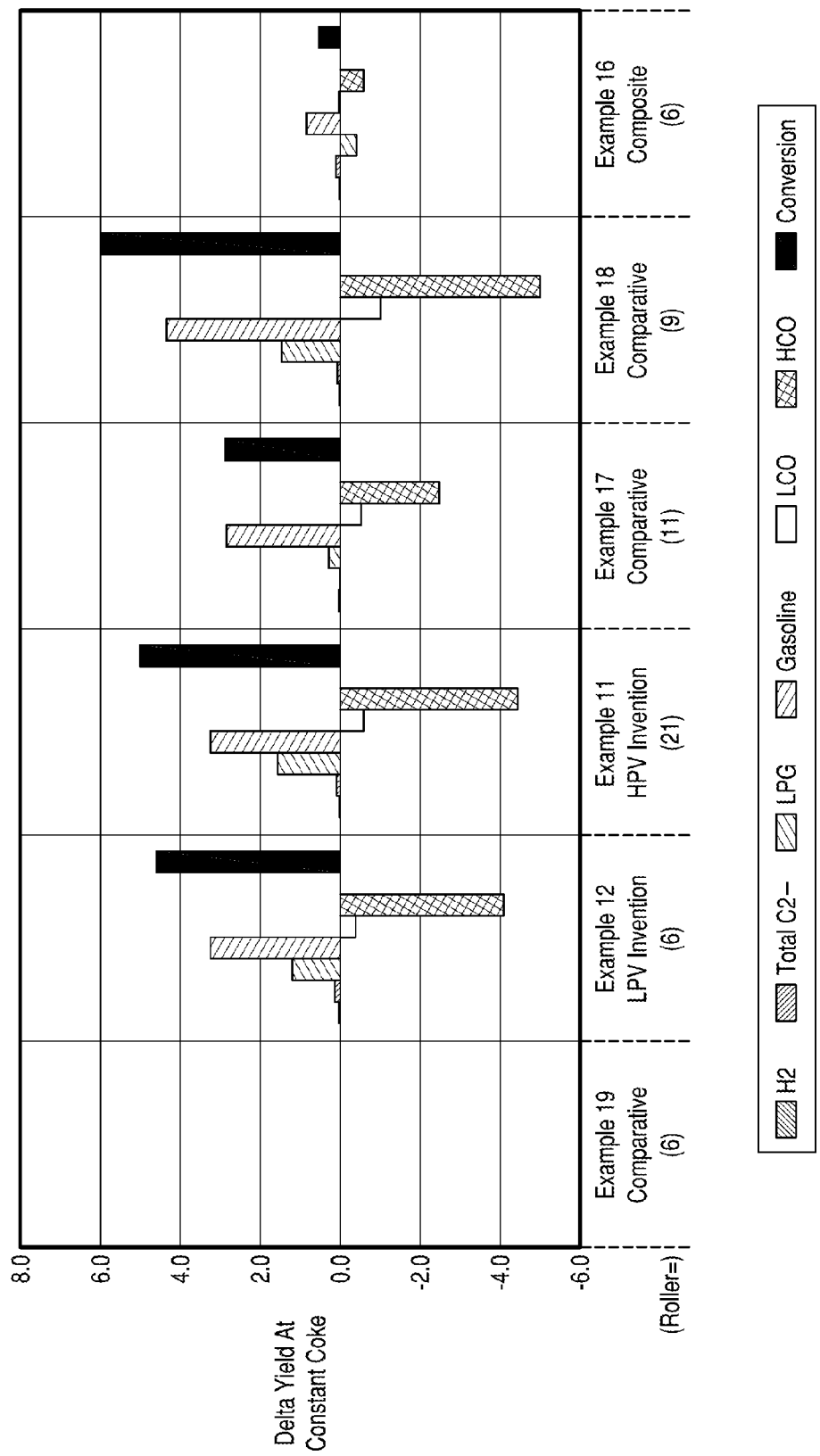
FIGS. 1 and 2 are bar graphs of catalytic performance as determined from Examples 18-23.

The FCC catalysts described herein display either improved yields of cracking products produced by the catalytic process, such as gasoline and/or propylene while maintaining attrition resistance when compared to conventional FCC catalysts, or improves attrition resistance without sacrificing cracked product yields. Achieving advances in both increased yields and increased attrition resistance is difficult as one benefit is normally traded off for another. The prior art provides methods for sliding up and down the performance curve defined by these trade-offs. The FCC catalysts described herein provide a means to operate off the defined performance curve of the prior art. An aspect of the discovery lies in identifying mass transfer issues as a source of limitations in the FCC catalytic process. One of ways in which the FCC catalyst described herein addresses the mass transfer issues is by reducing the diffusion path length through the catalyst.

A core/shell FCC catalyst is provided so that a majority of the catalyst volume is in an active shell containing matrix and zeolite and a minority of the catalyst volume is in a substantially inert core having substantially less cracking activity per unit volume. In one embodiment, the core has negligible cracking activity per unit volume. The diffusion path length from the exterior of the catalyst through the available active catalyst is therefore shorter than a conventional catalyst that does not have a substantially inert core but does have the same overall diameter. A major amount or majority refers to 50% or more while a minor amount or minority refers to less than 50%.

In general, the FCC catalyst contains from 50% to about 95% by volume of an active shell and from about 5% to less than 50% by volume of a substantially inert core. In particular, the FCC catalyst will contain from about 60% to about 90% by volume of an active shell and from about 10% to about 40% by volume of a substantially inert core. More preferably, the FCC catalyst will contain from about 65% to about 85% by volume of an active shell and from about 15% to about 35% by volume of a substantially inert core. Embodiments also include the FCC catalyst containing from about 70% to about 80% by volume of an active shell and from about 20% to about 30% by volume of a substantially inert core.

In general, the FCC catalyst has an overall average particle size (diameter) of from about 50 to about 100 microns, preferably from about 60 to about 90 microns, and more preferably, the FCC catalyst has an overall average particle size from about 70 to about 85 microns.

The overall FCC catalyst particle size and the relative size of the substantially inert core and active shell thickness are selected based on the specific demands of a target FCC process. For example, generally speaking, the larger the substantially inert core, a higher resultant selectivity is achieved mainly due to decreased diffusion path length (high selectivity referring to increased yield of desired cracking products gasoline/polypropylene while minimizing or decreasing the yield of undesired cracking products such as coke/gas). In contrast, generally speaking, the larger the active shell thickness, a higher activity is achieved mainly due to increased amounts of active catalyst.

In general, the substantially inert core has an average particle size (diameter) of from about 30 to about 60 microns. In preferred embodiments, the substantially inert core has an average particle size from about 35 to about 55 microns or from about 40 to about 50 microns.

In general, the active shell has an average thickness (measured from the outer surface of the substantially inert core to the outer surface of the FCC catalyst particle) of from about 5 to about 30 microns. In preferred embodiments, the shell will have an average thickness of from about 7 to about 25 microns, or from about 10 to about 20 microns.

If no economic constraints at all are applied to the catalyst of the invention then the useful compositions of the catalyst can vary substantially. Shell thickness could be reduced to just a few microns in order to more completely eliminate diffusion limitations. A shell thickness of 5 um corresponds to about ⅓ the volume of the catalyst, and this would probably still be economically favorable in the refinery. Alternatively, a shell thickness greater than 45 um could be attractive due to the smaller dilution effect, and this would still provide some yield benefits. Core/shell diameter, thicknesses and relative volume other than disclosed above should thus be considered within the scope of the invention.

It is not necessary that every square micron of the substantially inert core surface is covered by the active shell. In one embodiment, the active shell covers or surrounds at least about 60% of the substantially inert core surface. In another embodiment, the active shell covers or surrounds at least about 75% of the substantially inert core surface. In yet another embodiment, the active shell covers or surrounds at least about 90% of the substantially inert core surface. In still yet another embodiment, the active shell covers or surrounds substantially all of the substantially inert core surface.

The active shell may have either a relatively low pore volume, i.e. less than 0.30 cc/gm, preferably less than 0.25 cc/gm total porosity, or a relatively high pore volume, i.e. greater than 0.25 cc/gm, preferably greater than 0.30 cc/gm total porosity, (40-20,000 angstroms diameter) depending on a number of factors including the specific compounds cracked, the desired products of the cracking process, and the constraints of the cracking process. In embodiments where the active shell may have a relatively low pore volume, the active shell is quite attrition resistant and the catalyst desirably yields low fines and stack opacity. Due to the reduced diffusion path length of the FCC catalyst described herein compared to conventional catalysts that do not have a substantially inert core, cracking yields are improved even if both catalysts have comparable pore volume and attrition resistance.

In embodiments where the active shell has a relatively high pore volume, improved yields of cracking products are obtained from the catalytic process, such as gasoline, compared to the previously mentioned Structurally Enhanced Cracking Catalysts, or other more conventional catalysts that do not have a substantially inert core. While not wishing to be bound by any theory, it is believed that the substantially inert core reduces the diffusion path length, leading to the improved yields of cracking products. Prior art FCC catalysts with a relatively high pore volume have relatively low attrition resistance, but the higher pore volume was useful because it had maximized gasoline. It was not at all clear whether further increases in catalyst pore volume would have any impact on gasoline yields, and indeed, no improvement is expected if, as many believed, that intraparticle mass transfer is in no way limiting. Further, practical constraints on catalyst attrition losses such as regenerator stack opacity and expander catalyst deposits limit the degree which catalyst pore volume can be increased in practice. Thus further gasoline improvements are substantially not accessible by higher pore volume.

The most effective way to prepare the catalysts of the invention is to add an inert (core) microsphere of appropriate diameter to the spray drying slurry of prior art catalyst precursors and spray dry the mixture to obtain the typically-required FCC catalyst particle size. Non-limiting examples of prior art catalyst precursor slurries are disclosed, for example, in commonly assigned U.S. Pat. Nos. 4,493,902; 6,656,347; 6,673,235; 6,696,378; 6,716,338 for providing zeolite Y, and U.S. Pat. No. 7,344,695 for making ZSM-5, the entire contents of which are herein incorporated by reference. The spray drying step forms, if not a substantially uniform, yet nevertheless effective shell coating of the prior art in-situ reactive precursor surrounding the inert core. The substantially inert core contains a material that is either not directly involved or minimally involved in the catalytic cracking process. If the properties of the inert core are suitable, subsequent crystallization after spray drying (described later) yields zeolite and active matrix residue confined largely to the active shell region and comparatively little, if any, residual zeolite content or active matrix surface area remaining in the interior substantially inert core.

U.S. Pat. No. 5,082,814 Stockwell et al., Shell-coated FCC catalysts, provides a method of preparation of core/shell FCC catalysts. Because of the very small diameter of FCC catalysts (75-82 um APS), conventional coating and micro-encapsulation methods are not immediately applicable, and/or are uneconomical. The method of this patent has been applied to the formulations of the present invention in order to prepare the catalysts of the invention. Briefly, a slurry having a viscosity at low shear sufficient to suspend the core material in the slurry without mixing is prepared, and the material is spray dried. The remaining processing is done as if the composition were uniform, as in the prior art. The high viscosity at low shear is needed mainly at the pilot plant scale where linear velocities in tubing may be low enough to allow the core material to settle out and plug up the tubing, or where the slurry in the feed tank is not continuously agitated. This would also lead to poor shell uniformity and low shell loading if not corrected. If linear velocities are high enough, turbulent flow in the tubing to the spray drier may prevail and so the high viscosity at low shear needed for laminar flow may be unnecessary. Of course, the spray drying slurry should be of a sufficiently low viscosity at high shear so that it may be pumped and atomized successfully. That is, the slurry should behave as a pseudoplastic fluid, not a dilatant fluid. As is well known, carboxymethylcellulose can be added to give some pseudoplastic thickening. Alternatively, kaolin slurries can be over-dispersed to provide thickening, and sodium silicate solution has been commonly used to accomplish this. Sodium silicate levels in the slurry higher than needed to disperse the clay will of course gel the clay, and after spray drying the sodium silicate becomes the binder for the microsphere precursor. In general, binder is needed to hold the microsphere together during transport, makedown and the early part of zeolite crystallization. In the present case, this binder holds the shell on the core until zeolite is grown, at which point the zeolite becomes the binder for the catalyst of the invention.

When using the in-situ processing, the composition and structure of the core material is important in order to exclude or minimize to the extent possible, the nucleation and/or growth of zeolite inside the core. The core preferably will have a minimum of mesoporous matrix surface area and cracking activity after crystallization. It has been found that the inert kaolin activity-reducing (blending) microspheres described in the aforementioned commonly assigned prior art patents constitute suitable inert core materials, especially after calcining to increase the yield of mullite. These core microspheres are formed by spray drying dispersed kaolin to a targeted particle size and then calcining to form a relatively large proportion of mullite, i.e. >20%, preferably >40%, such that the microsphere sinters and the bulk density increases substantially, indicating a loss of pore volume and an increase in mullite content and crystallite size. Calcination should take place at >2050° F., preferably >2100° F., ideally >2300° F. for about 2-4 hours. Under these conditions the mullite crystallite size is large and the exposed matrix surface area after leaching during zeolite crystallization is low, i.e. <100 $m^2/g$, preferably <50 $m^2/g$, ideally <40 $m^2/g$). The sintering to low pore volume limits the space available for the zeolite to grow in, with the net result being a low zeolite, low matrix area, low activity, quasi-inert core.

Alternatively, the inert core can be formed from gibbsite aggregates that are calcined at similar temperatures to form alpha alumina microspheres of appropriate diameter. The surface area and pore volume of the alpha alumina materials would be minimal and such materials are not expected to interfere in the zeolite crystallization, making this a good alternative to fired kaolin microspheres.

It will be apparent that as more and more inert core material is added to a composition, the amount of zeolite in the catalyst and the catalyst's activity will be diminished. Thus, while increasing the core diameter is favorable for selectivities at fixed overall catalyst particle size due to the reduced shell thickness and diffusion path length, the loss of surface area and activity at some point becomes prohibitive. The catalysts of the mentioned commonly assigned patents typically are provided with steamed surface areas over 200 $m^2/g$, preferably at least 230 $m^2/g$. If the catalysts of the invention do not have comparable steamed activity, the displacement of the higher activity material with the lower activity material would constitute a net economic loss within both the production plant and the refining industry.

However, the economically desired surface areas and cracking activities are much higher than those provided by the conventional incorporated FCC catalysts. Incorporated catalysts are typically made by spray drying a mixture of zeolite powder, kaolin, an optional granular alumina matrix, and an inorganic binder. The incorporated catalyst technologies differ primarily by choice of the inorganic binder, with most commercial catalysts employing either an aluminum-stabilized $SiO_2$ hydrosol, a dispersible pseudo-boehmite binder reinforced with silica, or an aluminum chlorohydrol binder. Typically these systems contain 25-35% of zeolite Y and provide a steamed surface area of 120-140 $m^2/g$, sometimes as high as about 175 $m^2/g$. Thus, the catalysts of the present invention can still be regarded as useful if the steamed surface area is at least 100 $m^2/g$, preferably at least 120 $m^2/g$, most preferably 140-150 $m^2/g$. The economic pressures from the high activity prior art is dominant however, setting the essential performance requirement noted above at a higher level.

Understanding the economic constraints on the invention is essential to understanding the practical constraints placed on the composition. If the prior art catalysts are diluted in their activity by the addition of an inert core, means must be provided in practice to overcome the dilution of activity. Most of the surface area and activity of FCC catalysts derives from the zeolite, but the zeolite content of the commonly assigned prior art has already reached the stoichiometric or available pore space limit. Rare earth exchange also increases zeolite activity but rare earth levels are not a free variable, instead being constrained in effect by octane and propylene considerations. Thus, it is useful to improve in the catalyst of the invention the stability of the zeolite to hydrothermal aging by an amount sufficient to overcome the dilution with the inert core. In effect, the practical limit on the proportion and diameter of the core, or likewise on the thickness of the shell, is then determined by the degree to which the zeolite stability in the invention can be improved.

Most briefly, the entire shell of the core/shell catalyst of this invention are made from known precursor slurries used to form in-situ zeolite Y and ZSM-5 as described in previously mentioned U.S. Pat. Nos. 4,493,902; 6,656,347; 6,673,235; 6,696,378; 6,716,338 and 7,344,695. Thus, the FCC core/shell catalysts of the invention are generally provided by adding a substantially inert core microsphere to the zeolite/matrix precursor slurry known in the art and spray drying the slurry.

The processes for making the FCC catalysts involve several acts. The active shell precursors and substantially inert core microspheres are slurried with water. Examples of active shell precursors include hydrous kaolin, other clay such as bentonite or attapulgite, metakaolin, calcined exothermic kaolin with or, without mullite, mullite, aluminas, silica, alumina-silica, and any of calcined alumina, calcined silica, calcined alumina-silica, and mixtures thereof as is known.

Zeolite initiator and a source of sodium silicate may also be introduced into the precursor slurry.

The zeolite initiator optionally used may be provided from a number of sources as known and described in the previously mentioned commonly assigned U.S. patents. For example, the zeolite initiator may contain recycled fines produced during the crystallization process itself. Other zeolite initiators that may be used include fines produced during the crystallization process of another zeolite product or an amorphous zeolite initiator in a sodium silicate solution. As used herein, "amorphous zeolite initiator" means a zeolite initiator that exhibits no detectable crystallinity by x-ray diffraction.

The slurry is introduced into spray drier. Spray drying forms an effective, if not necessarily uniform, precursor shell coating surrounding the substantially inert core. If the properties of the substantially inert core are suitable, subsequent crystallization by the in-situ method by addition of alkali, e.g. sodium hydroxide, sodium silicate and, optionally, external seeding yields zeolite and active matrix residue confined largely to the catalyst shell region and comparatively little residual zeolite content or active matrix surface area remaining in the interior substantially inert core. Under the known in-situ crystallization conditions including relative amounts of the desired kaolin-containing and/or alumina-containing precursors, and ratio of same with any caustic and silicate and reaction process conditions of temperature, pH, and time, about 30-70 wt. % zeolite is crystallized relative to the weight of catalyst.

As is well known in the art of manufacturing in-situ crystallized zeolite-containing microspheres, after the crystallization process is terminated, the microspheres with zeolite crystallized in the active shell are separated from at least a major portion of their mother liquor. For example, this can be accomplished by filtering, e.g., by a belt filter. In the terminal portion of the belt filter, the microspheres may be contacted with water to wash residual mother liquor from the microspheres and to obtain core/shell microspheres that are substantially free of residual mother liquor.

As is well known in the art, after the crystallization reaction product is filtered from its mother liquor in a belt filter, the next act in the process depends on whether or not it is desired to reduce the micropore volume of the microspheres by silica retention and, if so, to what degree it is to be reduced. Silica retention, when it is desired, may be accomplished by either of two alternative processes.

In the first alternative, the microspheres with zeolite crystallized in the active shell are separated from the zeolite crystallization mother liquor so that a portion of the mother liquor is left entrained within the microspheres. This may be accomplished simply by filtering the microspheres in the belt filter, without washing the microspheres with water. The microspheres are then dried, leaving a portion of the mother liquor (including sodium silicate) in them.

In the second alternative, the microspheres separated in the belt filter are introduced into a silicate contactor where they are contacted with a sodium silicate solution, e.g., a solution containing about 20% by weight sodium silicate. In one embodiment, contacting takes place by moving the sodium silicate solution through a bed of microspheres. Next, the microspheres are dried leaving a portion of the sodium silicate in them. In both alternatives, drying is preferably conducted in flash drier, at an air inlet temperature above about 800° F.

The microspheres that are filtered in the belt filter contain the crystallized zeolite in the sodium form. Typically, the microspheres contain more than about 5% by weight $Na_2O$. In one embodiment, to prepare the FCC catalysts, a substantial portion of the sodium ions in the microspheres are replaced by ammonium or rare earth ions or both by ion exchange.

Ion exchange may be conducted by a number of known different ion exchange methods. In one embodiment, the microspheres are first exchanged one or more times with an ammonium nitrate solution at a pH from about 2.7 to about 7. The ion exchange(s) with ammonium ions may be followed by one or more ion exchanges with rare earth ions at a pH from about 2.7 to about 7. The rare earth may be provided as a single rare earth material or as a mixture of rare earth materials. The rare earth is usually provided in the form of nitrates or chlorides. Typically, the FCC catalysts may be ion exchanged to contain 1-10% by weight REO and less than about 0.7% by weight $Na_2O$, more typically, to less than about 0.25% by weight $Na_2O$.

After ion exchange is completed, the FCC catalyst microspheres containing an active shell and substantially inert core may be filtered and dried.

The complete exchanged process includes one or more intermediate calcination acts. The general process set forth in U.S. Pat. Nos. 4,493,902; 6,656,347; 6,673,235; 6,696,378; and 6,716,338, which are hereby incorporated by reference, may be employed to make the FCC catalysts, except that a substantially inert core microsphere is added to the slurry that is spray dried.

Below, more specific examples of preferred precursor compositions to form the outer shell are set forth. Along with the enumerated examples, these preferred precursor compositions to form the outer shell with in-situ crystallized zeolite and matrix represent non-limiting examples useful in the core/shell FCC catalysts of this invention. As previously stated, compositions for forming in-situ zeolite including zeolite Y and ZSM-5 are well known in the prior art.

If no economic constraints are applied to the catalyst of the invention then the useful compositions of the catalyst can vary substantially. After applying the economic and physical property constraints however, the most preferred composition has been determined. The composition of this precursor microsphere is 25 parts of hydrous kaolin, 25 parts of spinel-form calcined kaolin, 25 parts of mullite-form kaolin powder, and 25 parts of well-crystallized mullite-form core microspheres having an average particle size of about 45 um. The stoichiometry of this formulation will provide about 48% NaY in the crystallization product. If the shell is very roughly assumed to have the same density as the core, then the thickness of the shell is about 15 um and the diameter of the microsphere overall is 75 um or more.

The preferred kaolins have been described in U.S. Pat. No. 6,656,347. Preferably, the hydrous kaolin is LHT, the spinel is Ansilex-93, and the mullite powder is M-93, all from BASF Corporation. The mullite core is as described above. Other kaolin powder feedstocks can be used as is known in the art, and if these are used, some variation of mercury pore volume is expected in precursor microspheres, which in turn will lead to like variations in the finished catalyst pore volume and attrition resistance, as set forth in U.S. Pat. No. 6,656,347. When the most preferred calcined kaolins are prepared in slurries of minimal high shear viscosity at 50-60% solids, and then used with the most preferred hydrous kaolin and core material with a sodium silicate binder content of 6% $SiO_2$ relative to total kaolin, then the pore volume and attrition resistance of the shell are close to that of U.S. Pat. No. 6,656,347, which is to say high pore volume that maximizes gasoline. If the spinel or mullite slurry solids after makedown (or better yet, ISP) are lower, the resulting catalyst pore volume will be higher. As was shown in U.S. Pat. No. 6,656,347, small amounts of reactive metakaolin microspheres can then optionally be added to the zeolite crystallization process, along with the microsphere precursors to the invention, in order to obtain catalysts of the invention having controlled or specified pore volume and attrition resistance properties.

In one embodiment then, little or no metakaolin microspheres are added to the crystallization, and the product of the invention has the high pore volume and moderate attrition resistance of U.S. Pat. No. 6,656,347, in the shell region. This product is anticipated to have gasoline and coke yields superior in fact to U.S. Pat. No. 6,656,347, owing to the comparable pore volume but reduced diffusion path length.

In another embodiment, a larger amount (typically 7.5%) of metakaolin microspheres are added to the crystallization of the core/shell microspheres of the invention, resulting in a lower pore volume, more attrition-resistant shell comparable to U.S. Pat. Nos. 4,943,902, 6,696,378, or 6,716,338. Directionally, the lower pore volume reduces the yield of gasoline, but owing to the core/shell configuration, the gasoline yield of this embodiment is now shown herein superior to U.S. Pat. No. 6,696,378 and comparable to the higher pore volume prior art catalyst U.S. Pat. No. 6,656,347. This embodiment, however, also has the superior attrition resistance of U.S. Pat. No. 6,696,378, thus combining the virtues of the two technologies in a way unavailable before. While the core/shell concept is well known in catalysis in general for the solution of diffusion-controlled problems, it is not obvious in the present case that one could prepare core/shell catalysts for FCC which have a significant proportion of low activity or inert core, an active cracking shell of considerable thickness and durability, and with steamed surface area still suitable without adjustment or compromise for commercial applications. These obstacles are sufficient enough in fact to have led to considerable delay in this discovery, since one may argue that in fact intraparticle diffusion limitations have been theorized, anticipated or known for as much as a decade or more.

Many factors affect gasoline and other yields from FCC catalysts, including the relative amount of matrix activity. Increasing matrix activity generally tends to increase the LCO/Bottoms yield ratio and sometimes increases gasoline or coke yields. As set forth in U.S. Pat. No. 6,656,347, the matrix activity may be increased by either increasing the proportion of spinel-form kaolin versus mullite-form kaolin, or by decreasing the crystallinity of the mullite within a proportion of kaolin calcined through the exotherm. When the zeolite stability of the catalyst of the invention is improved to the desired extent, the 25 spinel-25 mullite composition most preferred provides a steamed zeolite/matrix surface area ratio comparable to U.S. Pat. No. 6,656,347 in commercial practice. Although other compositions may be used successfully, these ratios, together with the use of equivalent levels of rare earth on zeolite, promote straightforward comparisons of cracking yields between the invention and the prior art, without secondary artifacts. The most preferred products of U.S. Pat. No. 6,656,347 are also well optimized for the market so that these properties are also most useful in practice.

U.S. Pat. No. 6,656,347 (Stockwell et al., Structurally Enhanced Cracking Catalysts) lays out the compositional ratios and the embedded assumptions made therewith for the crystallization of NaY zeolite in situ from calcined kaolins. If the core material is mullite, then the composition of the core/shell microsphere during crystallization merely reflects this separate amount of mullite, and the crystallization proceeds normally, as if the core material had been uniformly dispersed throughout the microsphere. The phase-segregated $SiO_2$ formed during the calcination of the kaolin to mullite will largely dissolve, increasing the porosity of the core and revealing the mullite surfaces that are active for cracking. For this reason it is important that the mullite crystallites in the core be relatively large.

In another embodiment, a metals-tolerance function is provided over and above the kaolin-only formulations discussed so far. In U.S. Pat. No. 6,673,235, Harris et al., FCC catalysts for feeds containing nickel and vanadium, provides a macroporous catalyst with zeolite freely coating the walls which contains metals-passivating alumina, i.e. dispersible boehmite alumina, but the properties of the microspheres are spatially uniform and random. The catalyst of the invention is an improvement wherein the properties of the catalyst described in U.S. Pat. No. 6,673,235 are reproduced in the shell region, but the center of the microsphere is an inert or low activity core. Most preferably, the diameter of the core is about 45 um and the shell is on average about 15-18 um thick, and the shell is macroporous and of conventional attrition resistance. The attrition resistance of this composition is conventional and equivalent to U.S. Pat. No. 6,673,235, but the gasoline and other yields are anticipated to be superior to U.S. Pat. No. 6,673,235.

In yet another embodiment, there is provided a core/shell catalyst having metals tolerance and the superior attrition resistance needed for low stack opacity applications, but now with cracking yields improved over the prior art. This embodiment may be obtained by adding an inert core to the catalyst of either U.S. Pat. No. 6,716,338, or to U.S. Pat. No. 6,673,235 if additional metakaolin microspheres are added to the crystallization in this latter case. U.S. Pat. No. 6,716,338 provides a metal tolerant catalyst without macroporosity or zeolite freely coating the walls. Gasoline yields are reduced with respect to U.S. Pat. No. 6,673,235 but attrition resistance and stack opacity is superior. The catalyst of the invention made with U.S. Pat. No. 6,716,338 as the shell material will also have superior attrition resistance, but gasoline yields will be increased and presumed comparable to U.S. Pat. No. 6,673,235, owing to the novel core/shell morphology. If U.S. Pat. No. 6,673,235 is used as the shell material, superior attrition resistance can be obtained if supplemental metakaolin microspheres are added during crystallization. As in the other cases, this increases the limiting reagent alumina available during crystallization, which increases zeolite yield, reduces pore volume, and improves attrition resistance. Some sacrifice is made on cracking yields with respect to the invention with no supplemental metakaolin, but the yields are anticipated to be comparable to U.S. Pat. No. 6,673,235 and superior to U.S. Pat. No. 6,716,338.

All of the preferred catalysts are made by the in situ growth of zeolite in microspheres. However, the economics of core/shell technology allows preparation of the catalysts of this invention using the incorporated route. In this case zeolite powder, kaolin, optionally a granular alumina, and an inorganic binder are spray dried as usual, the improvement in which is the addition of inert or low activity core material to the spray drying formulation. Practical considerations and economic pressures will drive a compromise between the reduction in diffusion path length and the dilution of activity. In the incorporated case however, there is at least in principle more freedom to increase the level of zeolite and cracking activity in the shell. Attrition resistance and opacity performance may suffer if too much zeolite is incorporated, but some of the known binders are very effective. U.S. Pat. No. 6,884,744 in particular discloses an incorporated catalyst of ultra-high activity containing at least 70% zeolite, which is then diluted with a lower activity component. Although that patent provides materials quite suitable for the application of the present Invention, the concept of a lower activity or substantially inert core was not disclosed by those workers well skilled in the art.

Another approach is to formulate with reduced steamed surface area but higher rare earth, or at the same rare earth but at a higher replacement rate in the refinery. Either of these will increase the activity of the catalyst in practice.

In the incorporated method of forming the core/shell catalyst, the active shell of the FCC catalysts contains a zeolite component and a matrix component as in the in-situ method. Other components may be present. The zeolite is a major contributor for the catalyst activity. Examples of the zeolite component for incorporation are unlimited but, typically for FCC will include Y zeolite, beta zeolite, ZSM-5, etc. The zeolite can be treated with various modifications such as dealumination, rare earth exchange, phosphorous treatment, etc, to improve a property such as activity or stability. Although the term zeolite is typically construed to include materials containing silica and alumina, as used herein, zeolite further includes compounds where the silica and alumina portions may be replaced in whole or in part with other oxides. For example, germanium oxide, tin oxide, phosphorus oxide, and mixtures thereof can replace the silica portion. Boron oxide, iron oxide, gallium oxide, indium oxide, and mixtures thereof can replace the alumina portion. Accordingly, zeolite as used herein for the incorporation method includes not only materials containing silicon and, aluminum atoms in the crystalline lattice structure thereof, but also materials which contain suitable replacement atoms for such silicon and aluminum, such as gallosilicates, borosilicates, ferrosilicates, and the like.

Examples of typical matrix materials for the incorporation method are also unlimited, but typically include one or more of compounds such as silica, alumina such as gamma-alumina, mullite, silica-alumina, silica-magnesia, titania, zirconia, and clays such as bentonite, attapulgite, clarit, Fuller's earth, diatomaceous earth, kaolinite, halloysite, or montmorillonite. The matrix component can serve several purposes. It can be used to bind the zeolite component to form the active shell of the catalyst particles as well as bind the active shell to the substantially inert core. It can serve as a diffusion medium for the transport of feed and product molecules. In many cases, the matrix has cracking activity on its own and serves to improve bottoms upgrading. It also can act as a filler which dilutes the active shell to moderate the catalyst activity. In addition, the matrix can help heat transfer by providing bulk properties (heat transfer during regeneration and cracking and heat storage in large-scale catalytic cracking). The matrix may act as a sink for sodium in the sieve thus adding stability to the zeolite present in the active shell. The matrix may further serve by stabilizing the FCC catalyst towards heat and steam and mechanical attrition. In some instances the matrix provides high porosity so that the zeolite in the active shell can be used to its maximum capacity.

While the core/shell catalysts of this invention are described with inert cores, the invention can be illustrated by alternative embodiments. For example, the core/shell configuration can be achieved with cores and shells both being catalytically active but varying in activity, pore volume, composition, functionality, etc. Both in-situ and incorporated methods can be used to form the respective core and shell. A particularly useful core/shell catalyst is formed from a core of high pore volume as described in U.S. Pat. No. 6,656,347, and an active shell containing a metals passivation function such as in U.S. Pat. Nos. 6,673,235 and 6,716,338. Thus a core/shell catalyst of the Invention is optionally formed by including a zeolite precursor core microsphere prepared as in U.S. Pat. No. 6,656,347 in the spray drying step described in U.S. Pat. No. 6,673,235, with that resulting core/shell zeolite precursor microsphere later being crystallized to contain zeolite Y. It is preferred that at least one of the core and shell and, more preferably both, contain a zeolite and matrix. If formed by the in-situ method such as from a matrix containing a reactive alumina source such as calcined kaolin, it is most useful if the zeolite crystallization reaction is conducted subsequent to the formation of a zeolite precursor shell formed around a zeolite precursor core. For example, a formed microsphere containing reactive metakaolin can be spray dried with components such as reactive metakaolin to form an outer shell. Subsequent to spray drying, the appropriate levels of caustic and sodium silicate can be added to produce zeolite crystallization in both the core and shell. The utility of this embodiment lay in the absence of activity dilution by an inert core, so that the catalyst is economically viable without improvements in zeolite stability.

Fluid Catalytic Cracking (FCC) is the preferred refining process for converting higher boiling petroleum fractions into lower boiling products, such as gasoline, cracked naphtha and light olefins such as polypropylene. The FCC catalyst described herein is in the form of fine particles acts like a fluid and circulates in a closed cycle between a cracking reactor and a separate regenerator.

Generally, an FCC process involves contacting at least one hydrocarbon feedstream with the FCC catalyst described herein under effective catalytic reaction conditions to produce cracked products. An exemplary cracking process involves contacting at least one hydrocarbon feedstream and the FCC catalyst described herein in an FCC reactor and applying suitable heat to the reactor. Cracked products are then recovered. Typical temperatures at which the reactor is heated include from about 300 to about 800° C. In another embodiment, the reactor is heated include from about 400 to about 700° C., and typically between about 500 to 550° C.

The hydrocarbon feedstream typically contains hydrocarbonaceous oils, such as those that boil from about 200 to about 700° C. Examples of hydrocarbon feedstream components include one or more of gas oil, steam cracked gas oil and residues, heavy and reduced petroleum crude oil, petroleum atmospheric distillation bottoms, petroleum vacuum distillation bottoms, pitch, asphalt, bitumen, other heavy hydrocarbon residues, tar sand oils, shale oil, liquid products derived from coal liquefaction processes, Fischer-Tropsch liquids, gasoline, distillate, virgin naphtha and the like. Examples of cracked products from the cracking process described herein include one or more of hydrogen, light olefins (less than 5 carbon atoms), light paraffins, and olefins and paraffins having more than five carbon atoms, cracked naphtha, cracked gas oil, and coke. Cracked products can be liquid and/or gaseous.

Various advantages can be obtained as a result of the FCC catalysts described herein. For example, the FCC catalysts may increase conversion to cracked products like gasoline and propylene in FCC units which are constrained to use FCC catalysts giving low fines generation and stack opacity. The FCC catalysts may increase conversion to cracked products like gasoline and propylene in conventional FCC units not especially restricted by opacity limitations, without further increasing stack opacity and catalyst losses. The FCC catalysts may reduce the catalyst losses due to abrasion, and/or reduce air grid plugging or compressor blade fouling due to catalyst fines in FCC applications, while maintaining high conversion to gasoline and propylene. Furthermore, the above advantages may be achieved while the FCC catalysts simultaneously possess a contaminant metals passivation function.

And further still, the above advantages may optionally be achieved while the FCC catalysts simultaneously retain steamed surface area and equilibrium activity comparable to conventional FCC catalysts. Yet another advantage is that the FCC catalysts may improve the cracking conversion and yields for incorporated FCC catalysts in addition to in situ formed FCC catalysts when added as only a portion of the fresh catalyst additions to the FCC unit.

Consequently, also provided herein in connection with the cracking processes are methods of simultaneously increasing/improving conversion of feedstreams to cracked products while decreasing the generation of fines and improving stack opacity; methods of simultaneously increasing/improving conversion of feedstreams to cracked products while increasing/improving attrition resistance.

EXAMPLE

The following examples illustrate the subject invention. Unless otherwise indicated in the following examples and elsewhere in the specification and claims, all parts and percentages are by weight, all temperatures are in degrees Centigrade, and pressure is at or near atmospheric pressure.

Samples representative of the FCC catalysts described herein have been prepared and analyzed by roller attrition testing and ACE™ fixed fluidized bed cracking tests. Prior art in situ FCC catalysts (Structurally Enhanced and conventional in situ) were prepared side by side wherein the zeolite stability and attrition resistance of the comparative samples were representative of the state of the prior art. The FCC catalysts described herein contained 25% of substantially inert core before crystallization and so their surface areas as fresh or steamed catalysts would ordinarily be reduced. For reasons that are presently not well understood, the samples of the FCC catalysts described herein had improved zeolite stability sufficient to overcome the dilution effect due to the core. The samples of the FCC catalysts described herein are therefore economically viable because they do not reduce the ability to meet industry demand for FCC catalyst. It is surprising that samples of the FCC catalysts described were prepared having the qualities of: improved attrition resistance and yields, and conventional surface areas and cracking activity. The examples and associated figures demonstrate the results.

Example 1

Microsphere Precursor of the Invention

A microsphere was prepared containing 25 parts of LHT hydrous kaolin, 25 parts of Ansilex 93™ spinel-form calcined kaolin, 25 parts of M-93 mullite-form calcined kaolin powder, and 25 parts of mullite-form kaolin core microspheres. To this mixture of hydrous and calcined kaolins was added 2.56 parts of $SiO_2$ added from N-brand™ sodium silicate. The hydrous kaolin source was a 60% solids slurry of LHT, a coarse co-product of the centrifuging of a so-called grey kaolin clay for 90% by weight of particles less than 1 micron in size.

TABLE 1

Properties of clay feeds for microspheres of the invention, before and after their individual make-downs.

| Starting dry kaolin feeds | A-93 | M9-93 | Dry Core |
|---|---|---|---|
| ISP, wt % soldis | 50 | 52 | — |

TABLE 1-continued

Properties of clay feeds for microspheres of the invention, before and after their individual make-downs.

| | | | |
|---|---|---|---|
| TBD, g/ml | 0.39 | 0.39 | — |
| Feed for spray drying | A-93 at 50% solids | M-93 at 50% solids | Dry Core |
| Mullite content | 12 | 38 | 55 |
| Microtrac 50%<, um | 2.95 | 2.85 | 44 |
| Microtrac 90%<, um | 15.4 | 14.8 | 65 |
| TBD (on dried clay), g/ml | 0.70 | 0.58 | 1.1 |
| ISP (on dried clay), wt % solids | 52 | 49% | Not a powder |

The Ansilex-93 [A-93] pigment and M-93 were calcined commercially in a rotary calciner. Typically the A-93 mullite content by X-ray diffraction is <5%, but this sample measured as 12%. The M-93 mullite content was 38%. A-93 and M-93 were made down separately using an electrically-driven heavy duty Cowles mixer in a batch process where the dry calcined kaolin was added to the water that already contained Colloid 211 surfactant. The kaolin was added more slowly to the water as the mixture thickened. A very dilatant slurry was formed but continued mixing reduced the viscosity. Gradual addition of the calcined kaolin and continued mixing during 45 minutes or more led to 50% solids slurries for which the dilatancy was no longer apparent by casual inspection. Small samples were dried for ISP and TBD measurements. The increase in TBD after makedown at 50% solids and drying may be due in part to the work done on the starting material during make-down, or more likely to incomplete pulverization of the dried product, but the ISP of the dried kaolins from the 50% solids slurry were still in an acceptable range.

The core material was prepared by screening commercially prepared calcined kaolin microspheres (APS=75–80 um) below a 230 mesh sieve. This product was calcined at 2400° F. for four hours in cordierite trays to obtain maximal yield of well-crystallized mullite, and then crushed and sieved again below 230 mesh. The average particle size of the core material was 44 microns, the bulk density was 1.1 g/ml and the mullite content was 55%. The bulk density of the core is much larger than the A-93 and M-93 powders, indicating far lower pore volume.

The slurry for spray drying was formed by mixing the three component slurries and dry core in the 25:25:25:25 dry basis ratio using a 4 kg overall dry basis, as noted above, in an air-driven Cowles mixer. Directly to this slurry was to be added 0.857 kg of N-brand sodium silicate for a target of 6% $SiO_2$ binder. During the silicate addition, the slurry thickened and required the addition of 2 kg more of water. A large fraction of the intended sodium silicate was accidentally spilled so the actual binder content was determined later by sodium analysis to be 2.56 g $SiO_2$ per 100 g of kaolins. The final mixture was marginally pumpable and was spray dried using a #10 nozzle on a Stork-Bowen 3 ft diameter spray drier with air atomization pressure of 70 psi. At one point the nozzle was plugged up but a yield of 1.86 kg of grade product and 0.32 kg of fines were produced.

The as-sprayed material had a 0.68 gm/ml ABD (apparent bulk density) and analyzed with 1.35% $Na_2O$ and a 79 micron APS. This product was acid-neutralized by feeding the as spray dried microspheres to a bucket of cool stirred tap water, while co-feeding sufficient 40 Wt. % $H_2SO_4$ to keep the pH of the slurry between about 2.5 and 4. After all of the solids were added, the pH was monitored and controlled for 10 minutes before filtering and washing with tap water, and then dried overnight at about 250° F.

The acid-neutralized microspheres were calcined two hours at 1150° F. and then 2 hours at 1400° F. in preheated furnace using open cordierite trays during four hours. The product contained 21% mullite by X-ray diffraction, had 9.35% acid solubles, 0.577 cc/gm pore volume in the 40-20,000 angstrom diameter range by mercury porosimetry, a 90 micron APS by Microtrac, and a 0.68 gm/cc ABD.

Example 2

Core/Shell Catalysts with Poor Shell Quality

Prior to the successful spray drying described in Example 1, multiple attempts had been made using the same composition but different nozzle sizes and atomizer air pressures, in order to obtain an appropriate average particle size. Some of the runs gave finer APS and some of the runs yielded coarser spray dried APS than desired. These off spec runs were combined into a spray drying composite to be used for zeolite crystallization and stability studies, and as an example of poor shell uniformity and morphology, and potentially poor in performance.

The acid-neutralized microspheres were calcined four hours at 1400° F. in preheated furnace using open cordierite trays during four hours. The product contained 25% mullite by X-ray diffraction, had 8.3% acid solubles, 0.398 cc/gm pore volume in the 40-20,000 angstroms diameter range by mercury porosimetry, a 73 micron APS by Microtrac, and a 0.75 gm/cc ABD.

Examples 3-5

Crystallization of Invention Microspheres (Microsphere Precursor of the Invention) and Core/Shell Catalysts with Poor Shell Quality The microspheres of Examples 1 and 2 were then crystallized in the laboratory using N-brand sodium silicate using the process described in Examples 4-6 of U.S. Pat. No. 6,656,347 and the seeds of U.S. Pat. No. 4,631,262, incorporated herein by reference. Two crystallizations were run on the Invention of Example 1, the first with no supplemental metakaolin microspheres (MS-2; Example 3) and the second with 7.5% of the microspheres used being MS-2 metakaolin. The use of the MS-2 increases the available amount of limiting reagent reactive alumina, and therefore increases the theoretical stoichiometric yield of NaY zeolite (U.S. Pat. No. 6,656,347). 7.5% of MS-2 was also used in the crystallization of the Example 2 Composite. The crystallization ratios and data for the resulting product are seen in Table 2.

TABLE 2

| Crystallization of the Invention and off spec Composite | | | |
|---|---|---|---|
| Microsphere of | Example 1 | Example 1 | Example 2 |
| Crystallization of | Example 3 | Example 4 | Example 5 |
| Recipe | Invention | Invention | Composite |
| Hydrous Clay | 25.0% | 25% | 25.0% |
| Mullite | 50.0% | 50.0% | 50.0% |
| Spinel | 25% | 25% | 25% |
| Binder % $Si_2O$ | 2.56% | 2.56% | 6.00% |
| Binder modulus, w/w | 10,000 | 10,000 | 10,000 |
| Theoretical % Zeo Y max. | 50 | 57 | 57 |
| MS-2 (metakaolin) | 0.00% | 7.50% | 7.50% |
| $SiO2/Na_2O$, w/w | 2.80 | 2.73 | 3.02 |
| $H2O/Na_2O$, w/w | 9.00 | 9.00 | 9.00 |
| $SiO_2/Al_2O_3$, w/w | 9.50 | 9.50 | 9.50 |
| Seeds | 0.0040 | 0.0040 | 0.0040 |
| Microsphere grams | 250.0 | 175.8 | 371.0 |
| Seeds, g | 185.2 | 140.7 | 296.3 |
| N-BRAND, g | 337.2 | 398.9 | 757.9 |
| 50 wt. % NaOH, g | 89.6 | 79.4 | 128.1 |
| H2O, g | 414.8 | 373.9 | 660.1 |
| SDS, g | 0.0 | 0.0 | 0.0 |
| MS2, g | 0.0 | 14.2 | 28.9 |
| Zeolite % at 12 h | 7.3 | 31.9 | 12.4 |
| Zeolite % at 16 h | 28.2 | 48.9 | 40.0 |
| Zeolite % at 20 h | 40.0 | 48.0 | 44.0 |
| Hours Crystallized | 24 | 20 | 23 |
| XRD wt % NaY | 47 | 50 | — |
| UCS, A | 24.66 | 24.66 | — |
| Na2O, wt % | 7.8 | 8.57 | 8 |
| BET, m2/g | 418 | 431 | 388 |
| MSA, m2/g | 78 | 72 | 58 |
| ZSA, m2/g | 341 | 358 | 330 |
| ZSA/6.6 = % NaY | 52 | 54 | 50 |
| Microtrac APS, um | 89 | 93 | 108 |
| Roller, wt %/h | 21 | 6 | 6 |
| Hg pore volume, ml/g, by pore diameter intervals | | | |
| 40-100 A | 0.084 | 0.106, 0.061 | 0.072 |
| 100-600 A | 0.126 | 0.120, 0.105 | 0.081 |
| 600-20,000 A | 0.143 | 0.107, 0.096 | 0.111 |
| 40-20,000 A | 0.354 | 0.332, 0.262 | 0.265 |
| ABD (VF), g/ml | 0.66 | 0.69 | 0.76 |

The crystallizations gave about 50% NaY yield, close to the theoretical value, in 20-24 h. After washing with water, surface areas, unit cell size (UCS), laser particle size, Roller attrition loss testing, and pore size distribution by mercury intrusion were obtained. It is seen that without MS-2 addition, the attrition resistance of the invention was at the upper limit of acceptable for conventional FCC service (14 wt %/h target), but that the same spray dried microsphere could be crystallized with supplemental metakaolin to obtain an attrition-resistant catalyst suitable for low opacity FCC service (<8 wt %/h target). Two embodiments are thus usefully obtained with one basic feedstock microsphere.

Upon further review, the initial Hg total pore volume of 0.332 ml/g that was obtained seemed surprisingly high for a sample with such a low roller attrition rate. The original sample was retested and the result was 0.262 ml/g, which still seems to be surprisingly high. This calls into doubt the validity of the roller attrition number, but the 6 wt %/h result originally obtained was well in line with expectations from the many crystallizations ran with 7.5% MS2. The composite sample Example 5 has this same roller value at 7.5% MS2 for example. Sufficient sodium form of Example 4 was not available to re-run the roller test so the finished product 2×2 (2 ion exchanges and 2 calcinations) was tested in duplicate, with results of 5 and 4 wt %/h, validating the original roller test results.

Example 6

Microsphere for High Porosity Comparative Catalyst

For the present Example 6, microspheres were spray dried commercially according to Example 11 of U.S. Pat. No. 6,656,347.

Example 7

Microsphere for Low Porosity Comparative Catalyst

For the present Example 7, microspheres were spray dried commercially in accordance with U.S. Pat. No. 6,696,378.

Examples 8 and 10

Crystallization of the Comparative Catalysts

The microspheres of Examples 6 and 7 were crystallized in the laboratory using the concentrated sodium di-silicate mother liquor recycle stream (SDS) taken from the processes described therein. The crystallization ratios and data for the resulting product are given in Table 3. Two crystallizations were run on the microsphere precursor for the high pore volume Comparative catalyst (Example 6), the first with 20% supplemental metakaolin microspheres (MS-2; Example 8) and the second with 15% of the microspheres used being MS-2 metakaolin (Example 9). 7.5% of MS-2 was also used in the crystallization on the microsphere precursor for the low pore volume Comparative catalyst (Example 7).

TABLE 3

| Crystallization of the Comparative catalysts | | | |
|---|---|---|---|
| Microsphere of | Example 6 | Example 6 | Example 7 |
| Crystallization of | Example 8 | Example 9 | Example 10 |
| Recipe | 6,656,347 | 6,656,347 | 6,696,378 |
| Hydrous Clay | 33% | 33% | 53% |
| Mullite | 67% | 67% | 0% |
| Spinel | 0% | 0% | 57% |
| Binder % $Si_2O$ | 4.0% | 4.0% | 8.0% |
| Binder modulus, w/w | 2.9 | 2.9 | 2.9 |
| Theoretical % Zeo Y max. | 71 | 68 | 75 |
| MS-2 (metakaolin) | 20.0% | 15.0% | 7.5% |
| $SiO_2/Na_2O$, w/w | 2.60 | 2.63 | 2.63 |
| $H_2O/Na_2O$, w/w | 7.00 | 7.00 | 7.00 |
| $SO_2/Al_2O_3$, w/w | 7.00 | 7.00 | 5.80 |
| Seeds | 0.0040 | 0.0040 | 0.0040 |
| Microsphere grams | 322 | 342.0 | 558.7 |
| Seeds, g | 516.0 | 516.0 | 444.4 |
| N-BRAND, g | 0.0 | 0.0 | 0.0 |
| 50 wt. % NaOH | 5.0 | 12.2 | 55.5 |
| H2O, g | 363 | 347.9 | 606.8 |
| SDS, g | 1101 | 928.0 | 1438.9 |
| MS2, g | 78 | 58.0 | 41.3 |
| Zeolite % at 12 h | — | — | 59.0 |
| Zeolite % at 16 h | 60 | 61 | 57 |
| Zeolite % at 20 h | 61 | 54 | 70 |
| Hours Crystallized | 20 | 21 | 22 |
| XRD wt % NaY | 55 | 51 | 52 |
| UCS, A | 24.70 | 24.70 | 24.73 |
| Na2O, wt % | 11 | 10.5 | 12.70 |
| BET, m2/g | 483 | 489 | 520 |
| MSA, m2/g | 61 | 66 | 72 |
| ZSA, m2/g | 422 | 423 | 448 |
| ZSA/6.6 = % NaY | 64 | 64 | 68 |
| Microtrac APS, um | 81 | 82 | 84 |
| Roller, wt %/h | 9 | 9 | 6 |

The crystallizations gave about 64-68% NaY yield according to surface area, close to the theoretical value, in about 21 h. After washing with water, properties were obtained. The attrition resistance of the high and low pore volume Comparative catalysts were brought into the range found for the Invention by the MS-2 addition, with the Roller attrition loss for the low pore volume Invention and Comparative catalysts being equal.

Examples 11-13

Exchange and Steaming of the Invention

The sodium-form catalysts of Examples 3-5 were then ion-exchanged to finished products as follows. Sodium-form catalyst was added to 27 wt. % ammonium nitrate solution at 180° F. and pH of 2.8-3.2 while stirring and adding 50% $HNO_3$ drop-wise to control pH. After all of the catalyst was added, the slurry was stirred for 15 minutes, filtered, and the cake washed with twice the dry catalyst weight of de-ionized water. Two such exchanges were done where the weight ratio of catalyst to 27 wt. % ammonium nitrate was 1:2. The samples were then rare earth exchanged at 180° F. and pH of 4 to ultimately yield about 2.25% REO on the final catalyst.

The partially-exchanged materials were dried and then calcined for two hours using covered silica trays while initially containing 25 Wt. % moisture, and using preheated furnaces intended to operate at 1150° F. A problem with the temperature controller led to a final temperature over 1400° F. however. After calcination, "1×1" properties were collected and are reported in Table 4. Using the 1×1 samples, the ammonium exchange procedure was repeated three times (Examples 11-13) and the samples were then calcined again at 25% moisture and 1150° F. to form the finished "2×2" product. Finished products were then steamed in 100% steam for four hours at 1500° F.

TABLE 4

Exchange and Steaming of the Invention

| Microsphere of | Example 1 | Example 1 | Example 2 | | |
|---|---|---|---|---|---|
| Crystallization of | Example 3 | Example 4 | Example 5 | | |
| Catalyst of | Example 11 | Example 12 | Examples 13-16 | | |
| 1 × 1 | | | | | |
| Calcination | Uncontrolled | Uncontrolled | 1150° F. | | |
| Recipe | Invention | Invention | Composite | | |
| % REO | 2.85 | 2.84 | 2.5 | | |
| % Na2O | 1.725 | 1.88 | 2 | | |
| BET, m2/g | 362 | 364 | 347 | | |
| MSA, m2/g | 87 | 79 | 68 | | |
| ZSA, m2/g | 275 | 285 | 279 | | |
| XRD wt % NaY | 37 | 41 | — | | |
| UCS, A | 24.62 | 24.6 | — | | |
| 2 × 2 | | | | | |
| Recipe | Invention | Invention | Composite | Composite 3 × 2 | |
| XRD wt % NaY | 36 | 38 | — | — | |
| UCS, A | 24.5 | 24.49 | — | — | |
| Hg pore volume, ml/g, by pore diameter intervals | | | — | — | |
| 40-100 A | 0.087 | 0.114, 0.064 | — | — | |
| 100-600 A | 0.157 | 0.145, 0.123 | — | — | |
| 600-20,000 A | 0.168 | 0.106, 0.109 | — | — | |
| 40-20,000 A | 0.413 | 0.366, 0.296 | — | — | |
| BET, m2/g | 348 | 364 | — | 329 | |
| MSA, m2/g | 85 | 83 | — | 63 | |
| ZSA, m2/g | 262 | 281 | — | 266 | |
| REO, wt % | 2.15 | 1.85 | 2.1 | 2.1 | |
| Na2O, wt % | 0.13 | 0.16 | 0.21 | 0.11 | |
| 1500° F. Steamed Properties. Active Components Steamed without Bending | | | | | |
| Catalyst of | Example 11 | Example 12 | Example 13 | Example 14 | Example 15 | Example 16 |
| Steaming time | 4 h | 4 h | 4 h | 30 min | 60 min | 90 min |
| UCS, A | 24.25 | 24.28 | — | 24.35 | 24.34 | 24.31 |
| BET, m2/g | 248 | 258 | 180 | 255 | 248 | 242 |
| MSA, m2/g | 74 | 75 | 52 | 61 | 60 | 59 |
| ZSA, m2/g | 174 | 183 | 128 | 194 | 188 | 183 |
| ZSA/MSA steamed | 2.4 | 2.4 | 2.46 | 3.2 | 3.1 | 3.1 |
| % ZSA maint. Re Na-form | 51.2% | 50.9% | 38.79% | N/A | N/A | N/A |

The pore volumes on the catalyst of the invention (Example 12) that we initially obtained were surprisingly high for materials with such good sodium-form attrition resistance (then Example 4). As noted above, the discrepancy lead to re-testing the Hg PV of Example 12 and the second test gave 0.296 ml/g total pore volume, which is still surprisingly high for such a low attrition rate. Subsequent testing of the Example 12 finished product for roller attrition then gave 4 and then 5 wt %/h, essentially the same as the 6 wt %/h of the sodium form. The low opacity/good attrition properties for the Invention in the lower pore volume embodiment are thus confirmed, even though the pore volume itself was surprisingly high.

Upon steaming, excellent steamed surface areas for Examples 11 and 12 were found considering the relatively low starting zeolite content of these materials. For reasons that are not understood, the Composite of off spec materials (and many other samples) gave poorer zeolite stability and poor steamed surface area as compared to the high activity prior art. On the other hand, the steamed surface area of 180 $m^2/g$ is still well in excess of that obtained for incorporated catalysts (typically <150 $m^2/g$).

SEM/EDS elemental mapping was run on a rare earth exchanged version of Example 3 crystallization with no MS-2. The core materials had a greater intensity in the backscatter electron image due to the high density of the core. The core is high in alumina and usually lower in silica, reflecting the mullite composition $3Al_2O_3:2SiO_2$. The morphology was by no means perfect but most of the cores were single and roughly in the center of the microsphere and coated on all sides.

SEM/EDS elemental mapping was also run on a rare earth exchanged version of Example 6 crystallization with 7.5% MS-2 (Composite). The core materials had greater intensity in the backscatter electron image due to the high density of the core. Poor shell uniformity was evident in that many microspheres had multiple cores and thin shells. Example 12 is a low pore volume (LPV) prototype of the invention having roller attrition (6) equivalent to the conventional in situ Examples 10 or 19 (roller=6) that represents a low opacity level in the refinery. The yields are dramatically improved without any compromise in attrition. The degree of the improvement is surprising.

Examples 14-16

Steamed Composite at Target Surface Area

Hypothesizing that a mass transfer limitation exists then any samples having lower catalyst activity and surface area will hypothetically have improved selectivity as a result. Thus performance testing of Example 13 against higher surface area Examples 11 and 12 or higher activity prior art samples would give a built in bias in Example 13's favor. To eliminate this testing bias the remaining samples from Example 5 that were similar to Example 13 were combined and further exchanged to 0.11 wt % $Na_2O$ to improve hydrothermal stability. This still turned out to be insufficient in steam stability and so three shortened steamings were run at 1500° F., showing that a 90 min steaming could yield a steamed surface area and unit cell size close to Examples 11 and 12. This sample is more suitable for assessing the effect of shell morphology on yields.

Examples 17-19

Exchange and Steaming of the Comparative Catalysts

The sodium-form catalysts of Examples 8-10 were ion-exchanged and calcined to finished products in ways equivalent to the previous Examples. The rare earth target was higher considering the higher level of starting zeolite, which adjustment attempts to keep the rare earth on zeolite level constant. Calcinations were run at 1150° F. in covered trays with 25% moisture for 2 hours. The two high pore volume catalysts were processed to 2×2 products having a second calcination, but the low pore volume product was processed to a 2×1 product without the final calcination.

The Hg pore volume of the high pore volume comparative Example 18 was surprisingly high for such a low roller attrition as well and suspiciously close to Example 17. A lower rare earth product made earlier but with the same crystallization recipe gave a similar pore volume.

Finished catalyst products were then steamed in 100% steam for four hours at 1500° F. The results are depicted in Table 5.

TABLE 5

Exchange of the Comparative Catalysts

| Microsphere of | Example 6 | Example 6 | Example 7 |
|---|---|---|---|
| Crystallization of | Example 8 | Example 9 | Example 10 |
| Catalyst of | Example 17 | Example 18 | Example 19 |
|  | HPV | HPV | LPV Comparative |
| 1 × 1 |  |  |  |
|  |  |  |  |
| Recipe | 6,656,347 | 6,656,347 | 6,696,378 |
| % REO | 3.27 | 3.9 | 3 |
| % Na2O | 2.3 | 2.415 | 2.7 |
| BET, m2/g | 433 | 439 | 474 |
| MSA, m2/g | 79 | 84 | 96 |
| ZSA, m2/g | 353 | 355 | 378 |
| XRD wt % ZY | 35 | 37 | 43 |
| UCS, A | 24.69 | 24.7 | 24.65 |
| 2 × 2 finished properties |  |  |  |
|  |  |  |  |
| XRD wt % NaY | 35 | 35 | — |
| UCS, A | 24.54 | 24.58 | — |
| Hg pore volume, m/g, by pore diameter intervals |  |  |  |
|  |  |  |  |
| 40-100 A | 0.067 | 0.080 | 0.094 |
| 100-600 A | 0.154 | 0.168 | 0.054 |
| 600-20,000 A | 0.161 | 0.179 | 0.027 |

TABLE 5-continued

| Exchange of the Comparative Catalysts | | | |
|---|---|---|---|
| 40-20,000 A | 0.381 | 0.428 | 0.176 |
| BET, m2/g | 399 | 402 | 474 |
| MSA, m2/g | 74 | 76 | 83 |
| ZSA, m2/g | 325 | 326 | 391 |
| REO wt % | 3.4 | 3.29 | 2.9 |
| Na2O wt % | 0.17 | 0.16 | 0.33 |
| 1500° F. Steamed Properties. Active Components Steamed without Blending | | | |
| Catalyst of | Example 17 | Example 18 | Example 19 |
| Steaming time | 4 h | 4 h | 4 h |
| UCS, A | 24.3 | 24.30 | — |
| BET, m2/g | 243 | 240 | 233 |
| MSA, m2/g | 58 | 57 | 78 |
| ZSA, m2/g | 184 | 183 | 155 |
| ZSA/MSA steamed | 3.2 | 3.2 | 2.00 |
| % ZSA maint. Re Na— | 44 | 43 | 35 |

These commercially-produced microspheres were grown and processed under plant conditions in the laboratory, and gave representative properties for the prior art. Steamed surface areas were in excess of 220 m²/g.

Examples 20-25

Catalytic performance was determined using an ACE™ microscale fixed fluidized bed unit operating at a superficial 8 WHSV and 1000° F. using 9 grams of catalyst and a gas oil feed [Feed A of Table 5 in U.S. Pat. No. 6,656,347], substantially as described in U.S. Pat. No. 6,069,012, with the 2.125" injector position. The patent suggests this injector position corresponds to a 2-2.5 sec riser residence time. The catalyst strip time was held constant at 575 sec. The catalysts of Examples 11, 12, 16-19 were diluted with activity-adjusting microspheres as disclosed by Brown et al. in U.S. Pat. No. 4,943,902. However, in order to remain faithful to the teachings of U.S. Pat. No. 6,069,012 and conventional reaction engineering, it is clear that different catalysts should be evaluated at constant bed volume. This ensures that the height of the catalyst bed above the feed injection point is constant in the comparisons. In an effort to do this, these catalyst formulations were blended to equal ABD and tested at constant weight. This was done by using appropriate amounts of the activity-adjusting microspheres cited by Brown (ca. 0.98 ABD), and acid-neutralized and steamed kaolin microspheres having of ABD=0.63.

Figure 2:
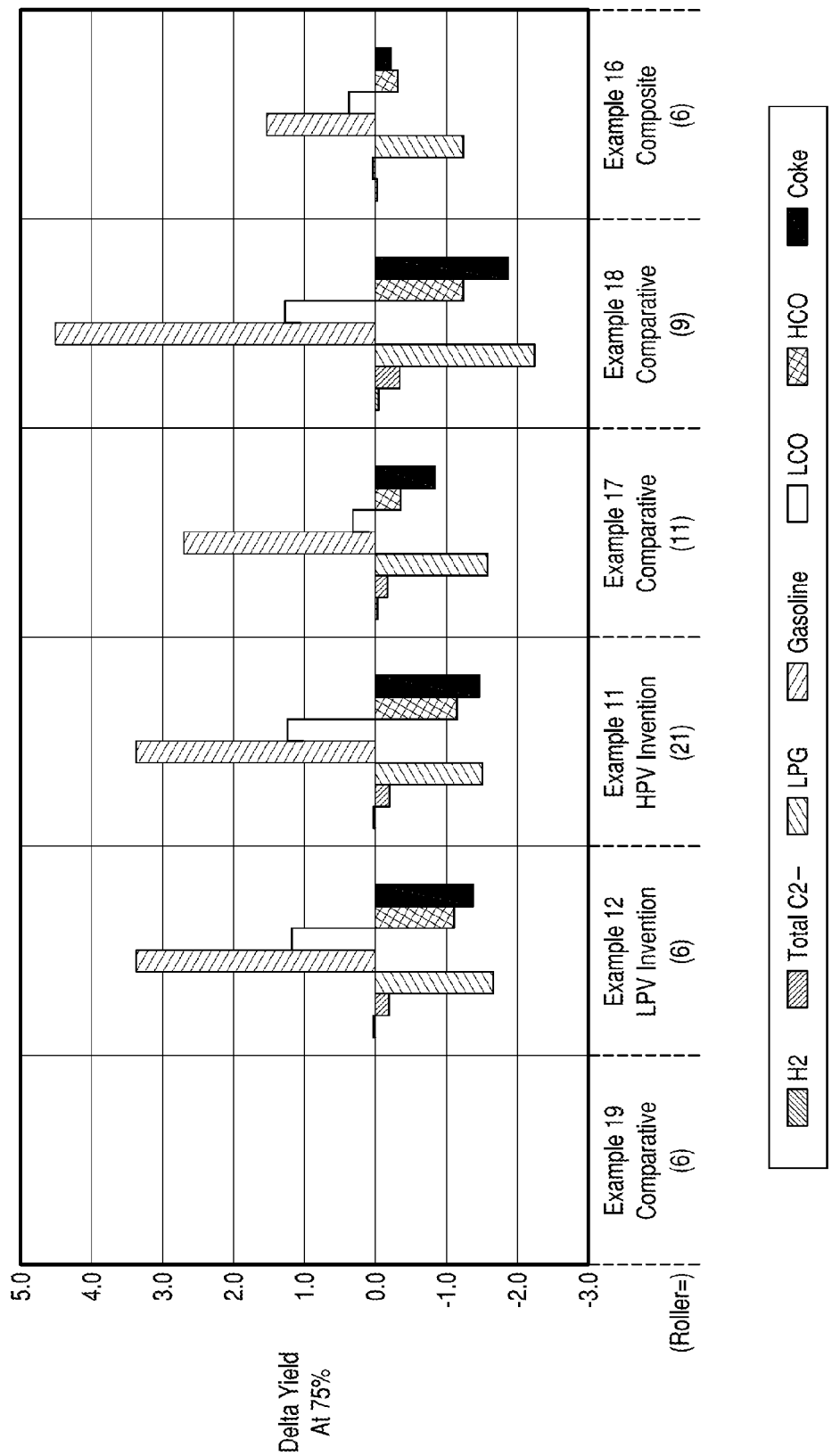

The catalytic results are shown in FIGS. 1 and 2.

Example 12 is a low pore volume (LPV) prototype of the invention having roller attrition (6) equivalent to the conventional in situ Example 19 (roller=6) that represents a low opacity level in the refinery. The yields are dramatically improved without any compromise in attrition. The degree of the improvement is surprising.

Example 11 is a higher pore volume (HPV) prototype of the invention with a higher rate of attrition (21) in the roller test. These yields are also dramatically improved over the low pore volume in situ control. Although the sample is higher in roller attrition than we might have desired, there is no benefit apparent over the lower pore volume Example 12 or the two prior art Examples 17 and 18 with lower attrition rates. This is most likely because the samples were prepared to meet a roller attrition target rather than a pore volume target. The pore volumes are unusually high for samples other than the LPV in situ comparative catalyst. Normally LPV is ≤0.2 and HPV=0.3-0.36 ml/g. Other testing has shown that ACE yields are sensitive to pore volume above about 0.3 ml/g but become insensitive above this range. The choice of steam deactivation and ACE operating conditions also play a role in the results. It is expected that the core/shell catalysts will deliver benefits at commercially viable pore volumes and attrition rates.

Of the two comparative Examples 17 and 18, one of the samples with equivalent attrition rate (9) gave much better yields. This performance difference is contrary to expectations and is believed to be a spurious result. Another sample had given yields similar to Example 17, but the Example 18 results are reported for completeness. In order to determine the precise performance ranking, we believe more extensive riser pilot plant testing is required. The improvement over conventional in situ however can nevertheless be taken as correct however.

One may argue that while the examples of the Invention met attrition targets, they were also higher than target in pore volume, and that it was the pore volume and not the core/shell configuration that led to the improved yields. We note however that the pore volume of the Invention in Example 12 was the same or lower than the HPV Comparative catalyst of Example 17, and that the steamed ZSA/MSA was also lower. Despite these detrimental differences, the Invention still had 15% lower coke selectivity at 75% conversion. Further supporting the contention that diffusion path length and shell quality affect cracking yields, the Composite of off specification core/shell materials gave lower gasoline and higher coke.

Refinery FCC units run at a constraint of constant coke. The standard method of ACE operation and data analysis has been criticized, but in practice the method has so far been found by the Inventor to underpredict the actual improvements found in the refinery. The results in FIG. 2 suggest the low coke found for the Invention will result in increased conversion, gasoline and propylene while maintaining stack opacity of the comparative in situ catalyst.

In summary, primary cracking product selectivities have been improved using the catalysts of the invention over the LPV Comparative catalyst Example 19; however, the lower pore volume, lower opacity catalyst of the Invention (Example 12, Roller=5 or 6 wt %/h) have done this at the same attrition resistance as the LPV Comparative Example 19. Thus these catalysts show the unusual and desirable traits of higher gasoline selectivity at constant attrition rate, stack opacity, steamed activity and unit cell size. Higher LCO selectivity at constant conversion is observed, which might be explained by the marginally lower steamed ZSA/MSA, as is known, but surprisingly we simultaneously find lower coke selectivity, in spite of the higher matrix activity of the Invention. Prior to the catalysts of the invention and U.S. Pat. No. 6,656,347, such performance characteristics normally had to be traded off one against another.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed:

1. A fluidizable cracking catalyst comprising:
   (i) a substantially inert core comprising at least one of mullite or alpha-alumina; and
   (ii) an active catalytic shell around the substantially inert core, the active catalytic shell comprising a zeolite catalyst incorporated in a matrix, wherein said zeolite catalyst is formed by in-situ crystallization of the zeolite within the matrix, wherein the active catalytic shell comprises 30 to 70 wt. % of said fluidizable cracking catalyst.

2. A fluidizable cracking catalyst comprising:
   (i) a substantially inert core; and
   (ii) an active catalytic shell around the core, the active catalytic shell comprising: an alumina having a metals passivation function and a zeolite catalyst incorporated in a matrix, wherein the zeolite catalyst is formed by in-situ crystallization of the zeolite within the matrix, wherein the active catalytic shell comprises 30 to 70 wt. % of said fluidizable cracking catalyst.

* * * * *